US007118520B2

(12) United States Patent
Hitchings

(10) Patent No.: US 7,118,520 B2
(45) Date of Patent: *Oct. 10, 2006

(54) METHOD OF PRODUCING A DATA DISK HOLDER WITH ADHESIVE SEAL STRIP

(75) Inventor: Timothy J. Hitchings, Isanti, MN (US)

(73) Assignee: Vinyl Art, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/042,913

(22) Filed: Jan. 24, 2005

(65) Prior Publication Data

US 2005/0155881 A1 Jul. 21, 2005

Related U.S. Application Data

(63) Continuation of application No. 10/323,275, filed on Dec. 18, 2002, now Pat. No. 6,892,879.

(60) Provisional application No. 60/402,294, filed on Aug. 8, 2002.

(51) Int. Cl.
*B31B 1/60* (2006.01)
(52) U.S. Cl. .................. 493/382; 493/377; 493/963
(58) Field of Classification Search ............ 493/382, 493/385, 377, 962, 963, 930; 53/445, 468, 53/469, 167; 206/312, 232
See application file for complete search history.

(56) References Cited

U.S. PATENT DOCUMENTS

| | | | |
|---|---|---|---|
| 3,507,444 A | 4/1970 | Werby | |
| 4,549,658 A | 10/1985 | Sfikas | |
| 4,709,812 A | 12/1987 | Kosterka | |
| 4,838,708 A | 6/1989 | Holcomb et al. | |
| 4,985,106 A * | 1/1991 | Nelson | 156/276 |
| 5,002,220 A | 3/1991 | Safranski | |
| 5,101,973 A | 4/1992 | Martinez | |
| 5,188,228 A | 2/1993 | Barrett | |
| 5,188,230 A | 2/1993 | O'Brien et al. | |
| 5,207,717 A | 5/1993 | Manning | |
| 5,307,927 A | 5/1994 | Curtis et al. | |
| 5,366,074 A | 11/1994 | O'Brien et al. | |
| 5,422,875 A | 6/1995 | Bribach | |
| 5,450,953 A | 9/1995 | Reisman | |
| 5,460,265 A | 10/1995 | Kiolbasa | |
| 5,462,160 A | 10/1995 | Youngs | |
| 5,518,488 A | 5/1996 | Schluger | |
| 5,590,912 A | 1/1997 | Stevens | |
| 5,595,293 A | 1/1997 | Miller | |
| 5,600,628 A | 2/1997 | Spector | |

(Continued)

*Primary Examiner*—Sameh H. Tawfik
(74) *Attorney, Agent, or Firm*—Schroeder & Siegfried, P.A.

(57) ABSTRACT

A method of producing an adhesively closable data disk holder having of a pair of heat-sealable plastic panels fused together to form an interior pocket with an opening thereto, wherein an additional adhesive layer is fused to the inner surface of one of the holder panels adjacent the opening thereof to facilitate adhesive closure of the opening without the use of an overlying flap. The adhesive layer is constructed of a thin panel of compatibly heat-sealable plastic material, one surface of which carries a pressure sensitive adhesive over which an adhesive release strip is disposed. The adhesive layer is disposed between the outer holder panels so that the adhesive release strip insulates against fusion to its adjacent panel, as the opposing non-adhesive surface of the adhesive layer is heat-sealed to its adjacent holder panel. The process results in a data disk holder having a substantially uniform thickness throughout which is particularly beneficial when used in a bindery process.

9 Claims, 5 Drawing Sheets

U.S. PATENT DOCUMENTS

| | | |
|---|---|---|
| 5,609,258 A | 3/1997 | Spector |
| 5,638,953 A | 6/1997 | House |
| 5,657,867 A | 8/1997 | Fu et al. |
| 5,669,491 A | 9/1997 | Petty |
| 5,690,220 A | 11/1997 | Swan |
| 5,694,743 A | 12/1997 | Beighle |
| 5,697,497 A | 12/1997 | Mallery |
| 5,713,605 A | 2/1998 | Pace et al. |
| 5,715,937 A | 2/1998 | Oshry et al. |
| 5,765,341 A * | 6/1998 | Insley et al. .................. 53/400 |
| 5,775,491 A | 7/1998 | Taniyama |
| 5,782,349 A | 7/1998 | Combs |
| 5,788,069 A | 8/1998 | Calhoun, III et al. |
| 5,788,114 A | 8/1998 | Perego |
| 5,826,717 A | 10/1998 | Eskandry |
| 5,857,565 A | 1/1999 | Baker et al. |
| 5,875,614 A | 3/1999 | Youngs et al. |
| 5,881,538 A * | 3/1999 | Blohm ........................ 53/461 |
| 6,202,839 B1 | 3/2001 | Petersen et al. |
| 6,360,889 B1 | 3/2002 | Combs |
| 6,461,044 B1 * | 10/2002 | Anderson ................... 383/211 |
| 6,673,408 B1 * | 1/2004 | Roth ......................... 428/40.1 |
| 6,719,132 B1 | 4/2004 | Sanders |
| 6,968,944 B1 * | 11/2005 | Hitchings ................ 206/308.1 |

\* cited by examiner

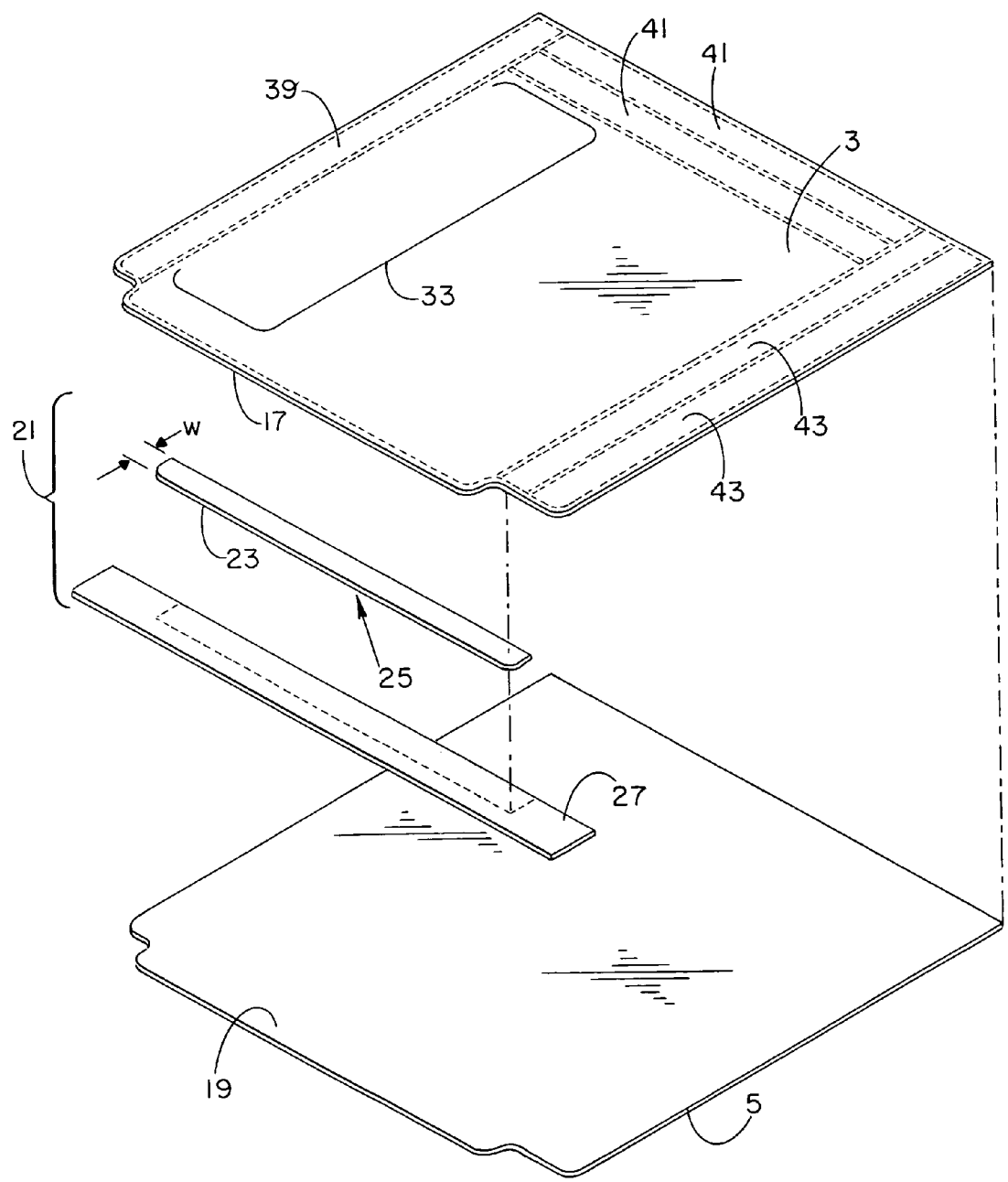

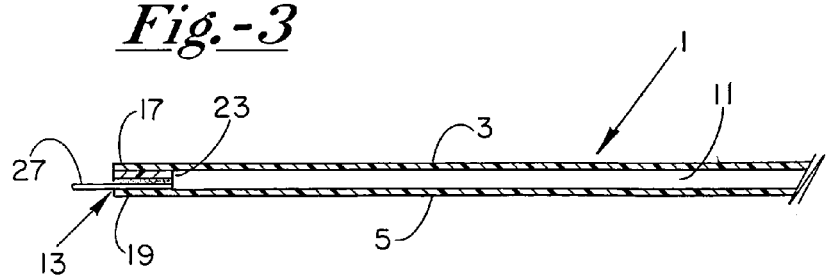
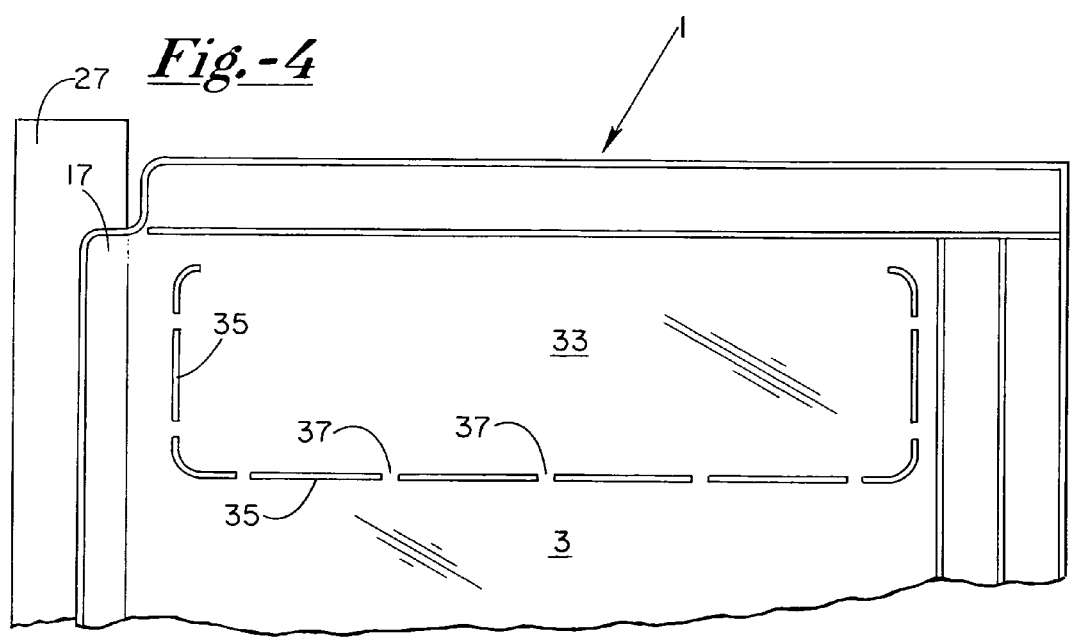

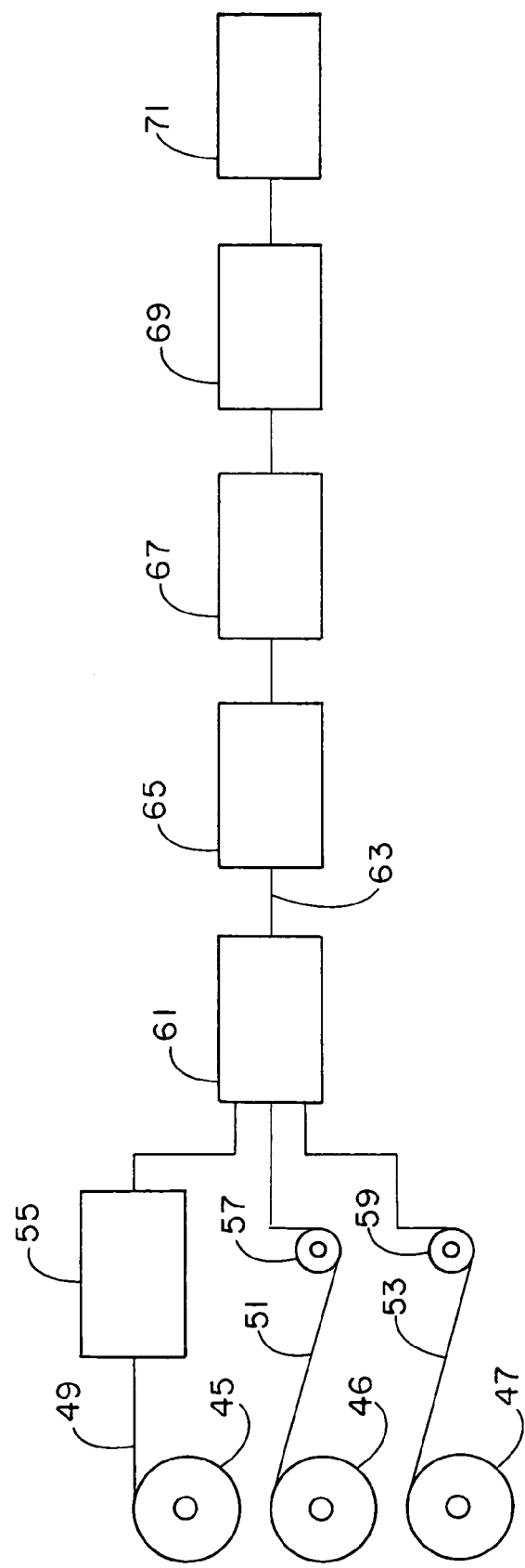

METHOD OF PRODUCING A DATA DISK HOLDER WITH ADHESIVE SEAL STRIP

CROSS REFERENCE TO RELATED APPLICATIONS

This application is a continuation of prior co-assigned and application Ser. No. 10/323,275, filed Dec. 18, 2002, now U.S. Pat. 6,892,879 and entitled "DATA DISK HOLDER WITH ADHESIVE SEAL STRIP," now allowed, which claims the benefit of the filing date of prior provisional application Ser. No. 60/402,294, filed on Aug. 8, 2002 by the same inventor, Timothy J. Hitchings, and entitled "POCKET HOLDER WITH PRESSURE CLOSURE ON OUTSIDE EDGE," all of which forms the basis of Applicant's priority claim herein under 35 U.S.C. §120.

BACKGROUND OF THE INVENTION

The present invention is related generally to the field of data disk holders for storage of compact disks and the like. More specifically, the present invention is related to data disk holders having adhesively sealable closures and a method of constructing same.

Data disk holders constructed of pliable plastic or polymeric materials are in common use for storage of compact disks, as well as other data disks. A typical data disk holder of this type generally includes a pair of outer thermoplastic layers of material, such as polyvinylchloride ("vinyl") or polypropylene, sealed together at least along some of the edges to form a pocket into which such a data disk may be inserted. Examples of such holders can be found in U.S. Pat. Nos. 4,850,731 and 5,462,160, issued to Youngs. Such disk holders as shown in these patents are generally constructed with an overlying flap for covering the opening to the interior pocket of the holder. Such flap may or may not include some form of an adhesive for securing the same in a closed position.

More recently, it has become desirous for publishers and the like to perfect bind such data disk holders containing the disks directly into books and other publications. In this case, the data disk holders containing the disks are passed through the signature gathering and binding machinery of a bindery process simultaneously with other signatures of the publication to be bound therein.

One such process is shown in U.S. Pat. No. 6,360,889. In this patent, a data disk is fully encapsulated within an all-vinyl case prior to binding the same within a book or the like. However, this process requires specialized equipment for handling and placement of the data disk within the sealing head for subsequent encapsulation. The data disk manufacturer must therefore either invest in such specialized encapsulating equipment, or separately package and send the data disk to an alternate site having such capabilities.

Since customer requirements oftentimes dictate different needs for loading and/or shipping the data disks within the disk holders, it is considered desirous to maintain flexibility as to when such loading of the disk takes place through the use of an adhesive closure device. By providing the flexibility of an adhesive closure, no specialized equipment is required for contemporaneous handling of the data disk and holder. Therefore, such data disk holders may be manufactured separately, and then sent to the data disk manufacturer for subsequent loading prior to binding the same.

Including such disk holders in the bindery process, however, creates certain manufacturing, handling, and security concerns which make it impractical to use conventional disk holders having adhesive closure flaps, as shown and described in the above patents. Conventional disk holders having an adhesive closure flap tend to form an additional gap at the fold which creates a non-uniform edge thickness. This causes the binding equipment to pick a place the disk holders unevenly, thereby jamming the equipment and causing significant manufacturing and handling issues during the bindery process. This also makes such data disk holders difficult to stack because the thicker edge causes the stack to be higher on one side, and thus unbalanced.

Safety is also a concern in that data disk holders bound within a printed publication are susceptible to theft and/or vandalism. While it is oftentimes considered desirable for the data disk holder to accommodate reusable storage for a data disk, allowing unfettered access to the disk is generally considered inadvisable. Although it is difficult to prevent theft or vandalism, it is preferable that any such reusable disk holder provide some means of indicating tampering with the contents thereof.

Therefore, it is evident that there is a distinct need for a data disk holder having a user friendly adhesive closure which eliminates the need for a folded flap and can be manufactured of a substantially uniform thickness for more balanced and even handling by the binding equipment in a bindery process. It is the objective of the instant invention to provide such a data disk holder which will add to the efficiency in assembly and provide greater through-put in the bindery process with fewer handling problems, thereby reducing associated labor costs therewith. It is also the objective of the instant invention to provide such a data disk that facilitates reusable storage of a data disk, and which includes safety means for warning of unwanted tampering with the data disk contained therein.

BRIEF SUMMARY OF THE INVENTION

In accordance with the present invention, an adhesively closable data disk holder is provided which is formed by a pair of relatively thin, pliable sheets or panels of heat-sealable material, such as vinyl or polypropylene, fused together to form an interior pocket with an opening accessible thereto. In the preferred embodiment, a first and second panel of heat-sealable material is provided, wherein the first panel overlays the second panel and at least one peripheral seal is formed therebetween to form a pocket with an opening thereto. The peripheral seal extends about the major corresponding edge portions of the two panels, with the remaining unsealed edge portions forming the opening to the interior pocket. Preferably, the opposing panels have corresponding generally rectangular configurations, and the peripheral seal extends about three edges thereof to define an interior pocket suitably sized for receipt of a data disk, such as a compact disk. The corresponding fourth edge of such panels remain unsealed to define the opening to the interior pocket.

Disposed between the first and second panel of heat-sealable material and adjacent the opening-defining edge portions thereof is an adhesive layer or strip that provides means for closure of the pocket opening once a data disk has been loaded therein. This adhesive strip is formed of a relatively thin adhesively coated panel of heat-sealable material, substantially consistent in thickness to that of the outer panels of the disk holder. One surface of the adhesive strip is heat-sealed to the opening-defining portions of one pocket panel, and the opposing surface carries a pressure sensitive adhesive suitable for bonding to the opening-defining portions of the opposing pocket panel. An adhesive release strip or peel-strip is disposed over the adhesive coating to prevent premature bonding and closure of the pocket opening prior to loading a data disk therein.

Upon removal of the adhesive release strip, the opening-defining edge portions of the first and second panel to the pocket will adhere together in tight forming relation with no outer flap being folded thereover. Since the adhesive strip is extremely thin, there is little or no noticeable deviation of thickness at the opening of the holder relative to the remainder thereof. This essentially completes the encapsulation of the data disk with an extremely difficult-to-open adhesive seal, which helps further to deter would-be thieves and the like. Importantly, this also provides a data disk holder with a consistent and substantially uniform thickness that is suitable for use in a bindery process without the consequential handling problems caused by prior art devices.

Depending on the heat-sealable material used, the manufacture of my improved data disk holder may be accomplished through the use of known thermal welding techniques utilized for plastics, such as RF welding, sonic or thermal contact welding. In the preferred embodiment, the first panel of heat-sealable material is disposed over the second panel, with the heat-sealable adhesive strip disposed therebetween and positioned along one edge designated to define the pocket opening. The first and second panel, and adhesive strip, are then fed simultaneously into an appropriate welding apparatus, where a forming dye is pressed into the upper first panel of heat-sealable material. With the adhesive strip sandwiched between the first and second panel, and the adhesive release paper facing toward the second panel, the energy provided to heat-seal the first and second panels together also causes the adhesive strip to fuse to the upper first panel. The adhesive release strip, on the other hand, functions as an insulator, and prevents fusion of the adhesive strip to the lower second panel. This effectively creates the desired opening to accommodate insertion of a data disk within the pouch of the pocket formed by the first and second panels, and simultaneously fuses the adhesive strip to the interior surface of the pocket immediately adjacent the opening.

At least one of the peripheral edges of the data disk holder preferably includes a severable trim portion that is disposed exteriorly of the peripheral seal forming the pocket thereof. Such trim portions help to facilitate handling of the data disk holder in the signature grabbing operation of a bindery process, and are trimmable along with the aligned edge portions of the remaining signatures to form consistent and evenly bound pages within a publication.

Once the adhesive seal has been effected at the opening of the data disk holder, the data disk becomes fully encapsulated and fully sealed within the pocket thereof. In the event that the data disk holder is to be bound within a publication, it may then be shipped or otherwise transported to the bindery, with the disk enclosed for subsequent binding within the desired publication. In order to provide access to the interior of the pocket and to the data disk contained therein, an optional security window may be die-cut or scored within one of the panels forming the pocket of the data disk holder. With the area defining such window being scored so as to leave intermittent links between the window and panel within which it is cut, opening of the window will provide an indication of access to or tampering with the contents of the holder.

By constructing the adhesive closure of my data disk holder in the above manner, no fold-over flap is present at the closure, and the overall thickness of the holder throughout is thinner and more uniform. Consequently, such holders are more balanced when stacked, which is particularly beneficial in a bindery process, where multiple holders may be stacked for processing through the signature gathering and trimming operations. With more uniform and balanced holders, the binding equipment will pick and place the holders more evenly, thereby causing fewer equipment jams and handling problems. Thus, the bindery equipment will run more efficiently, and less cost intensive rework and salvage operations will be required.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 2 is an exploded perspective view of the data disk holder shown in FIG. 1, showing the construction thereof.

FIG. 3 is a cross-sectional view of a portion of the data disk holder shown in FIG. 1, taken along line 3—3 and enlarged to show the layered construction thereof.

FIG. 4 is a blown up partial plan view of the data disk holder shown in FIG. 1, illustrating the scored die cut that forms the security access window thereto.

FIG. 6 is a block diagram of a known manufacturing process for mass producing the data disk holder shown in FIG. 1.

DETAILED DESCRIPTION OF THE INVENTION

Figure 1:
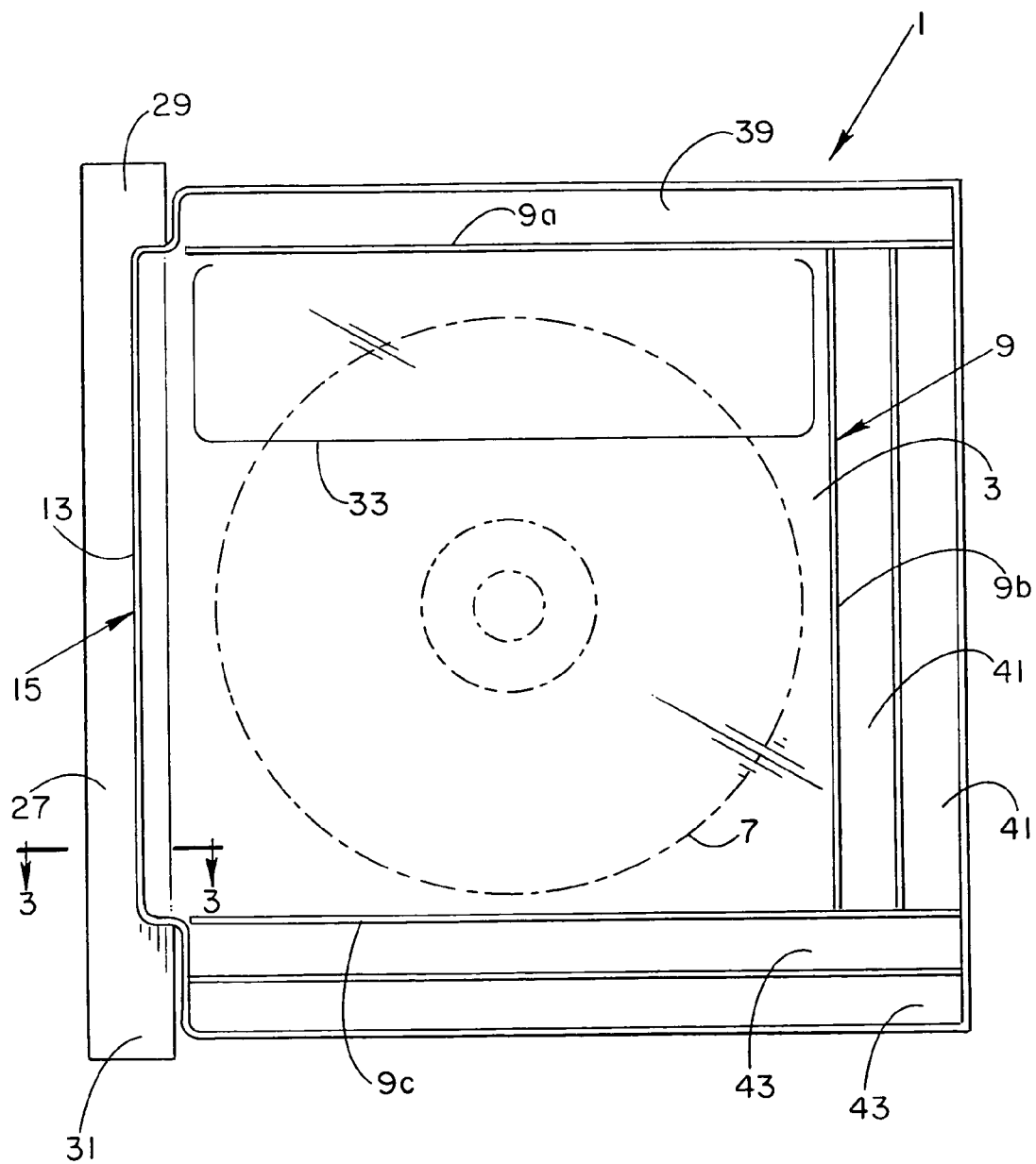
FIG. 1 is a plan view of an adhesively closable data disk holder incorporating the principles of my invention.

With reference being made to FIGS. 1, 2, and 3 of the drawings, there is illustrated an adhesively closable data disk holder 1 incorporating the principles of my invention. As shown therein, data disk holder 1 is formed by a pair of relatively thin, pliable sheets or panels 3 and 5 of heat-sealable material, such as vinyl or polypropylene, fused together to form an interior pocket 11 capable of receiving and storing a data disk 7 (shown in phantom). Preferably, at least panel 3 of holder 1 is transparent so as to enable viewing of the contents thereof.

The size and shape of panels 3 and 5 may vary considerably. However, as shown in FIG. 2, panels 3 and 5 are correspondingly configured such that no portion of one panel is designed to be folded over the other. In the preferred embodiment, the first panel 3 of heat-sealable material overlays the second panel 5 and at least one generally peripheral seal 9 is formed therebetween, so as to define the interior pocket 11 for receipt and storage of data disk 7. As shown in FIG. 1, heat-seal 9, defined by sealing segments 9a, 9b, and 9c, extends generally about three (3) peripheral edge portions of the correspondingly configured generally rectangular panels 3 and 5. This leaves the fourth peripheral edge portion 13 of holder 1 unsealed so as to define an opening 15 which communicates with the interior pocket 11 thereof.

As shown best in FIGS. 2 and 3, disposed between the outer panels 3 and 5, and adjacent the respective opening-defining edge portions 17 and 19 thereof, is an adhesive layer or strip 21 that provides means for closure of the pocket opening 15 once a data disk 7 has been inserted into pocket 11. As shown in FIG. 2, this adhesive layer 21 is formed of a relatively thin panel of heat-sealable material 23 that is sealably compatible with and substantially consistent in thickness to the outer panels 3 and 5 of the data disk holder 1. More specifically, panel 23 of adhesive layer 21 is preferably constructed with an overall width "W" that is substantially less than the overall width of panels 3 and 5, and is configured to conform in shape to the opening-defining edge portions 17 and 19 thereof.

In the preferred embodiment, the opening-defining edge portions 17 and 19 of panels 3 and 5 are formed as a pair of protruding lips extending slightly outward from the main body portions of such panels. The upper surface of panel 23, which is configured to have a width "W" approximately equal to that of the protruding edge portions 17 and 19, is heat-sealed to edge portion 17 of panel 3. The opposing lower surface 25 of panel 23, which faces panel 5, is coated with a pressure sensitive adhesive, and carries an adhesive release or peel-strip 27 thereover. Release strip 27 covers the adhesive coating of panel 23 and functions to insulate panel 5 from premature bonding or sealing to panel 23, and consequent closure of the pocket opening 15 prior to loading a data disk 7 into pocket 11.

Until the adhesive release strip 27 is removed, the adhesive layer 21 will not seal opening 15 shut, and a data disk 7 may be inserted within the inner pocket 11 of holder 1. As best shown in FIG. 1, release strip 27 is constructed to extend outwardly beyond the outer confines of edge portions 17 and 19 of panels 3 and 5 so as to form a pair tabs 29 and 31 which may be grasped to aid in the removal of the release strip. Upon removal of the release strip 27, the opening-defining edge portions 17 and 19 of panels 3 and 5 may be adhesively bonded together in tightly sealed relation with no outer flap being folded thereover.

Since the adhesive strip 27, like panels 3 and 5, is extremely thin, there is little or no noticeable deviation of thickness at the opening 15 of holder 1 relative to the remainder thereof. Adhesively sealing the opening 15 of pocket holder 1 essentially completes the encapsulation of the data disk 7 therein with an extremely difficult-to-open seal. This not only helps to further deter would-be thieves and the like, but also provides the data disk holder with a consistent and substantially uniform thickness throughout that is suitable for use in a bindery process, as will be described in more detail hereafter.

With the data disk 7 sealed within the interior pocket 11 of the data disk holder 1, access thereto may be provided through the formation of a security access window 33, as shown in FIG. 4. Window 33 may be formed in a die-cutting operation that scores at least one of the panels 3 or 5 about an area defining window 33. As shown in FIG. 4, panel 3 of the data disk holder 1 is scored in a die-cutting operation to define a peripheral area of alternating slits 35 and links 37 that define the accessible window 33. In order to access the contents of interior pocket 11 of data disk holder 1, links 37 of the scored area defining window 33 must be broken, thereby allowing window 33 to be folded outwardly from panel 3.

Notably, the peripheral cut made to form window 33 is dimensioned to have a width extending at least the diameter of the data disk 7 contained within the holder 1, so as to allow the data disk 7 to be removed from and reinserted therein for reusable storage. Once initial access to the interior pocket 11 is made through window 33, links 37 are fully severed, providing indication of access to the contents of the data disk holder 1. Prior to initial use by the end user, such links 37 function as a security measure to provide indication of unauthorized tampering with the contents of the data disk holder 1.

As discussed previously, the relatively thin and substantially uniform thickness of the data disk holder 1 makes it particularly well suited for use in the bindery process of a perfect bound publication. As shown in FIG. 1, in order to further facilitate and enable the handling of the data disk holder 1 in the signature grabbing and trimming operations of a bindery process, the holder 1 may be provided with additional trim portions 39, 41 and 43. Although optional, these trim portions do facilitate handling by the binding equipment and provide for trimming tolerances in the binding process. Such trim portions may be severed along with edge portions of other signatures during the trimming operation to provide clean cut edges for binding and finishing the desired publication.

Figure 5:
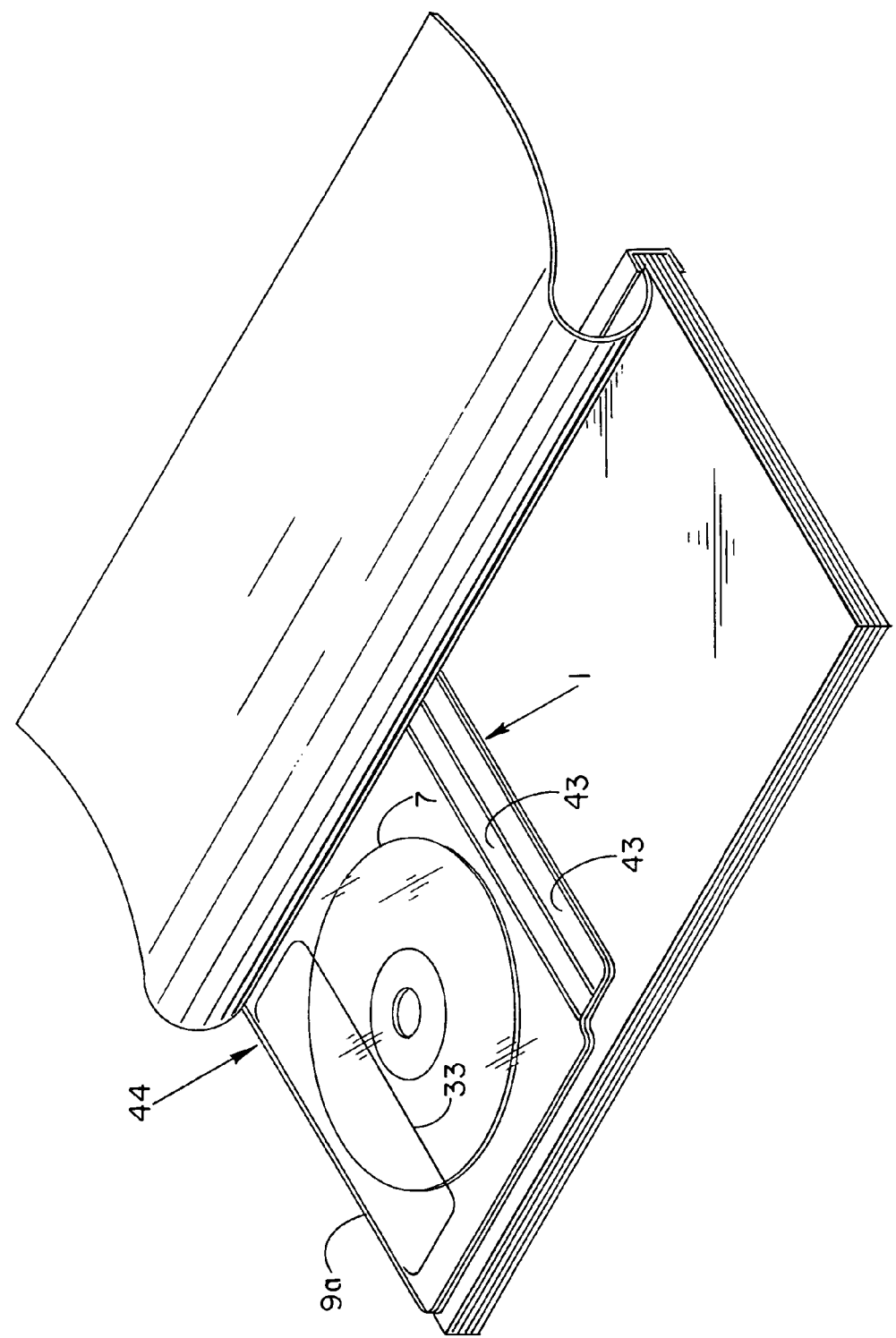
FIG. 5 is a perspective view of the data disk holder shown in FIG. 1 bound into a publication after trimming.

As shown in FIG. 5, a sealed data disk holder 1 containing disk 7 has been perfect bound through known techniques into a book 44 or the like. In so doing, one or more trim portions 41, disposed opposite the sealed opening 15 of holder 1, has been severed in the trimming operation along with the edge portions of other signatures to provide a clean edge for application of the binding glue thereto. Similarly, trim portion 39 is also shown as having been severed during a trimming operation to provide an aligned finished top edge to the book pages. Although portions 39 and 41 of data disk holder 1 are shown severed in FIG. 5, other and additional trim portions may also be severed, depending on customer requirements and the intended placement of the holder 1 within publication 44.

Since the opening 15 is sealed shut, the data disk holder 1 effectively becomes a permanent storage device for the data disk 7, and access to the interior pocket 11 thereof can only be made through window 33. Because of the uniform thin construction of the data disk holder 1, having no flaps covering the opening 15 thereto, the holder 1 seats well within the bound publication 45 in a manner consistent with, and compatible to, the remaining pages therein.

While it is certainly conceivable that such a data disk holder 1 could be manufactured individually, for commercial purposes it is deemed preferable to mass produce such data disk holders 1 through the use of a continuous manufacturing process, as illustrated diagrammatically in FIG. 6. As shown in FIG. 6, the materials used in the manufacture of the data disk holder 1 are stored in the form of large sheets or webs of material rolled up on reels 45, 46 and 47. The webs of material 49, 51 and 53 stored on the reels may be constructed of any compatibly heat-sealable material, but are preferably formed of a thermoplastic material, such as vinyl or polypropylene.

In the present invention, the upper web of material 49 is utilized in the formation of multiple first panels 3 for a plurality of data disk holders 1, and is preferably transparent. Material web 49 is passed through a die-cutter 55, which performs the scoring operation that forms the security access window 33 for each of the holders 1. Material webs 51 and 53 stored on reels 46 and 47 are used in the formation of the adhesive layer 21 and panel 5, respectively, of each data disk holder 1.

Material web 51, as stored on reel 46, is precut to the desired width "W", and carries the pressure sensitive adhesive and adhesive release strip 27 on its lower surface facing material web 53. Both webs of material 51 and 53 bypass the die-cutter 55 on bypass rollers 57 and 59, and are advanced to the sealing head 61, where they join with material web 49.

Sealing head 61 thermally welds and forms the appropriate seals between material webs 49, 51, and 53 to secure the adhesive layer 21 to panel 3 and define the interior pocket 11 of each data disk holder 1.

Depending on the heat-sealable material used in the manufacture of the data disk holder 1, thermal fusion of the respective panels may be accomplished through the use of known thermal welding techniques used for plastics, such as RF welding, sonic or thermal contact welding. For instance, if material webs 49, 51 and 53 are constructed of vinyl, RF welding is preferably used in the formation of the required seals, and if polypropylene is used as the material of choice, thermal contact welding may be used in the formation of the required seals.

As shown in FIG. 6, the upper material web 49 is disposed over the lower material web 53 as it enters the sealing head 61, with material web 51 (constituting adhesive strip 21) disposed therebetween. Material web 51 is positioned along one edge of webs 49 and 53 designated to define the pocket openings 15 of each data disk holder 1. Upon feeding material webs 49, 51, and 53 simultaneously through sealing head 61, multiple interconnected data disk holder 1's are formed with peripheral seals 9 defining a plurality of individual pockets 11 between webs 49 and 53.

With material web 51 sandwiched between the upper and lower material webs 49 and 53, and the adhesive release strip 27 facing material web 53, the energy provided by sealing head 61 to heat-seal the upper and lower webs 49 and 53 together simultaneously fuses the intermediate material web 51 to material web 49. Since the lower surface of web 51 carries the adhesive release strip 27, it is effectively insulated from fusing to web 53, thereby defining the unsealed edges 13 and pocket openings 15 to the plurality of data disk holders 1 formed thereby.

Upon exiting the sealing head 61, webs 49, 51 and 53 are effectively fused together into a single material web 63 comprised of a plurality of interconnected data disk holders 1. Web 63 is then fed into a rotary knife cutter 65 which longitudinally cuts and separates web 63 into separate rows of interconnected data disk holders 1. Such severed rows of holders are then advanced by indexer 67 to a second rotary cutter 69 which makes final transverse cuts to separate each of the rows into distinct units of single or multiple data disk holders 1, depending on customer requirements. Since it may be desirable in certain applications (i.e., book binding, etc.) to ship or store multiple data disks together, it is contemplated that multiple data disk holders 1 may be contained on a single unit or sheet. Upon completion of the cutting operations, the individual units of data disk holders 1 are advanced to a conveyor 71 for further handling and processing.

With the use of the above-described automated and continuous manufacturing process, such adhesively closable data disk holders 1 may be mass produced and packaged for shipment to data disk manufacturers, who in turn may load the desired data disk 7 within the holders and supply the same to their desired destination. Once the data disk 7 has been inserted within the pocket 11 of holder 1, the adhesive seal may be effected at the opening 15, thereby fully encapsulating the data disk 7 therein. In the event that the data disk holder is to be bound within a publication, it may be shipped or otherwise transported from the disk manufacturer to the bindery with the data disk already enclosed therein, where it can thereafter be bound without the need for specialized handling equipment.

By eliminating any fold-over flap and providing an adhesively closable data disk holder 1 that is substantially uniform in thickness, cost intensive manufacturing and handling issues due to reworking operations and jamming of equipment may be substantially reduced during the bindery process. Moreover, the substantially uniform thickness of the data disk holder 1 also facilitates more even stacking of the holders, thereby further improving handling and ease of shipment.

It will, of course, be understood that various changes may be made in the form, details, arrangement and proportions of the parts without departing from the scope of the invention which comprises the matter shown and described herein and set forth in the appended claims.

The invention claimed:

1. A method of manufacturing an adhesively sealable data disk holder, comprising:
    (a) providing first and second panels of heat-sealable material;
    (b) providing a third panel of heat-sealable material having an adhesively coated surface with a removable seal barrier over said adhesively coated surface;
    (c) forming at least one heat-seal fusing said first and second panels together in such manner as to define an interior pocket therebetween with an opening to the exterior, said pocket being suitable for holding a data disk therein; and
    (d) forming at least one heat-seal fusing said third panel to said first panel adjacent said opening with said adhesively coated surface facing said second panel, to form a sealable opened data disk holder having said removable seal barrier attached to the adhesively coated surface.

2. The method of claim 1, wherein step (c) and step (d) are conducted simultaneously.

3. The method of claim 1, wherein said step of providing a third panel of heat-sealable material includes the use of a pressure sensitive adhesive for said adhesive coating.

4. The method of claim 3, wherein said step of providing a third panel of heat-sealable material includes providing said third panel with an adhesive release strip disposed over said pressure sensitive adhesive coating.

5. The method of claim 4, wherein step (c) and step (d) are conducted simultaneously, and said adhesive release strip insulates said second panel from thermal fusion to said third panel.

6. The method of claim 1, including the step of forming in at least one of said first and second panels a tamper resistant security access window to said pocket.

7. The method of claim 6, wherein said step of forming said access window includes scoring an area of said panel within which it is formed over said pocket.

8. The method of claim 1, wherein said step of forming at least one heat-seal between said first and second panels includes forming outer panel trim portions exterior to said at least one heat-seal for facilitating trimming and binding of the data disk holder within a bound publication.

9. A method of producing a data disk holder, comprising:
    (a) providing a first panel of sealable material;
    (b) providing a second panel of sealable material;
    (c) sealing at least portions of said second panel with corresponding portions of said first panel to cooperatively define a pocket therebetween and an opening into said pocket suitable for a data disk to pass therethrough;
    (d) providing a third panel of sealable material, having a pair of opposite sides, one of which has an adhesively coated surface with a removable seal barrier over said adhesively coated surface, and;

(e) sealing the other of said opposite sides to said opening-defining portions of one of said first and second panels, with said adhesively coated surface being disposed opposite the opening-defining portion of the other of said first and second panels, to form a sealable opened data disk holder having said removable seal barrier attached to the adhesively coated surface.

* * * * *